(12) United States Patent
Uyeno et al.

(10) Patent No.: US 11,835,705 B2
(45) Date of Patent: Dec. 5, 2023

(54) OPTICAL SENSOR WITH TX/RX APERTURE SHARING ELEMENT (ASE) TO BLOCK DETECTION OF THE RECEIVED ACTIVE SIGNAL

(71) Applicant: Raytheon Company, Waltham, MA (US)

(72) Inventors: Gerald P. Uyeno, Tucson, AZ (US); Eric Rogala, Tucson, AZ (US); Mark K. Lange, Tucson, AZ (US); Sean D. Keller, Tucson, AZ (US); Vanessa Reyna, Tucson, AZ (US); Benn H. Gleason, Tucson, AZ (US); Craig O. Shott, Benson, AZ (US); Garret A. Odom, Tucson, AZ (US); Jon E. Leigh, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 530 days.

(21) Appl. No.: 17/065,177

(22) Filed: Oct. 7, 2020

(65) Prior Publication Data
US 2022/0107490 A1    Apr. 7, 2022

(51) Int. Cl.
*F16M 11/12*        (2006.01)
*G02B 23/16*        (2006.01)

(52) U.S. Cl.
CPC ........... *G02B 23/16* (2013.01); *F16M 11/123* (2013.01)

(58) Field of Classification Search
CPC .................................................... F16M 11/123
See application file for complete search history.

(56) References Cited

U.S. PATENT DOCUMENTS

| | | | |
|---|---|---|---|
| 3,899,145 A | 8/1975 | Stephenson | |
| 6,021,975 A * | 2/2000 | Livingston | ............ G01S 7/4811 244/3.13 |
| 6,268,944 B1 | 7/2001 | Szapiel | |
| 6,359,681 B1 | 3/2002 | Housand et al. | |
| 6,792,028 B2 | 9/2004 | Cook et al. | |
| 7,304,296 B2 | 12/2007 | Mills et al. | |
| 7,626,152 B2 | 12/2009 | King et al. | |
| 7,667,190 B2 | 2/2010 | Mills et al. | |

(Continued)

FOREIGN PATENT DOCUMENTS

| | | |
|---|---|---|
| WO | WO-2022115164 A2 | 6/2022 |
| WO | WO-2022115164 A3 | 6/2022 |

OTHER PUBLICATIONS

"U.S. Appl. No. 17/071,767, Notice of Allowance dated Feb. 15, 2023", 12 pgs.

(Continued)

*Primary Examiner* — Thanh Luu
(74) *Attorney, Agent, or Firm* — Schwegman Lundberg & Woessner, P.A.

(57) ABSTRACT

Optical sensors and particularly gimbaled optical sensors transmit an active signal at a given wavelength and receive passive signals over a range of wavelengths while controlling pointing without benefit of measuring and locating the active signal return. The sensor includes a Tx/Rx Aperture Sharing Element (ASE) is configured to block the received active signal (e.g. reflections off a target in a scene) and process only the passive emissions. These optical sensors may, for example, be used with guided munitions or autonomous vehicles.

19 Claims, 5 Drawing Sheets

(56) References Cited

U.S. PATENT DOCUMENTS

| | | | |
|---|---|---|---|
| 8,380,025 | B2 | 2/2013 | Anderson et al. |
| 9,632,166 | B2 | 4/2017 | Trail et al. |
| 10,444,492 | B2 | 10/2019 | Hopkins et al. |
| 2003/0062468 | A1 | 4/2003 | Byren et al. |
| 2003/0179444 | A1* | 9/2003 | Cook .................. G02B 17/0663 359/365 |
| 2004/0021852 | A1* | 2/2004 | DeFlumere ........... F41G 7/2246 356/141.1 |
| 2008/0118247 | A1* | 5/2008 | Drago .................. H04B 10/118 398/122 |
| 2014/0253999 | A1* | 9/2014 | Hegg .................. G02B 17/0657 359/432 |
| 2015/0043599 | A1 | 2/2015 | Yanagida et al. |
| 2016/0223327 | A1* | 8/2016 | Norman ............... F16M 11/123 |
| 2022/0120861 | A1 | 4/2022 | Keller et al. |
| 2022/0121035 | A1 | 4/2022 | Rogala et al. |

OTHER PUBLICATIONS

"U.S. Appl. No. 17/071,767, Response filed Oct. 7, 2022 to Restriction Requirement dated Sep. 29, 2022", 8 pgs.

"U.S. Appl. No. 17/071,767, Restriction Requirement dated Sep. 29, 2022", 6 pgs.

"International Application Serial No. PCT/US2021/053725, International Preliminary Report on Patentability dated Apr. 20, 2023", 10 pgs.

"International Application Serial No. PCT/US2021/053725, International Search Report dated Aug. 16, 2022", 4 pgs.

"International Application Serial No. PCT/US2021/053725, Written Opinion dated Aug. 16, 2022", 8 pgs.

Siegman, A. E., "Unstable optical resonators for laser applications", Proceedings of the IEEE, vol. 53, Issue 3, (Mar. 1965), 277-287.

\* cited by examiner

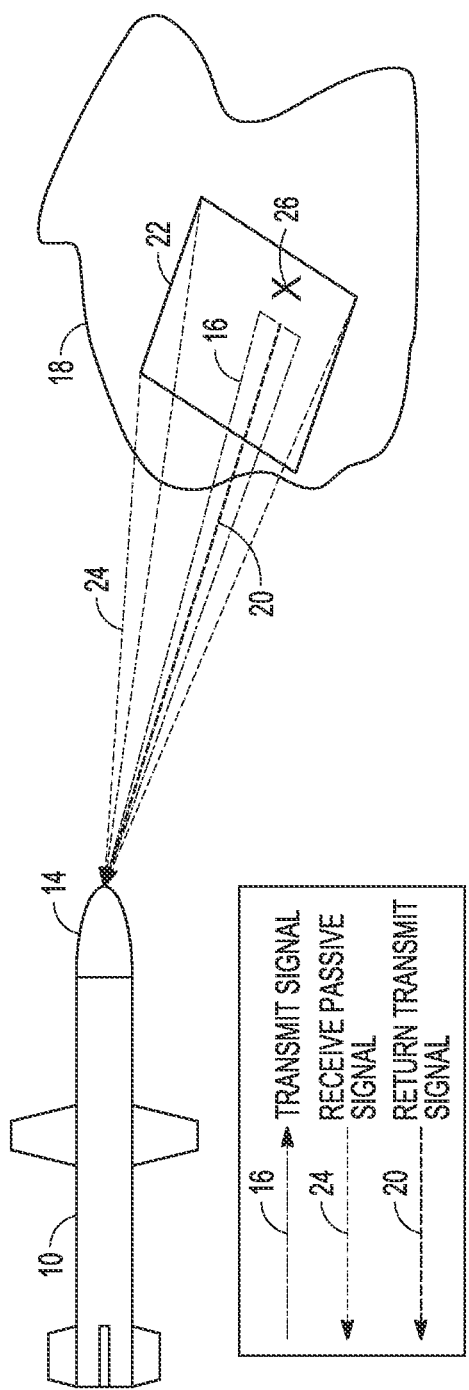
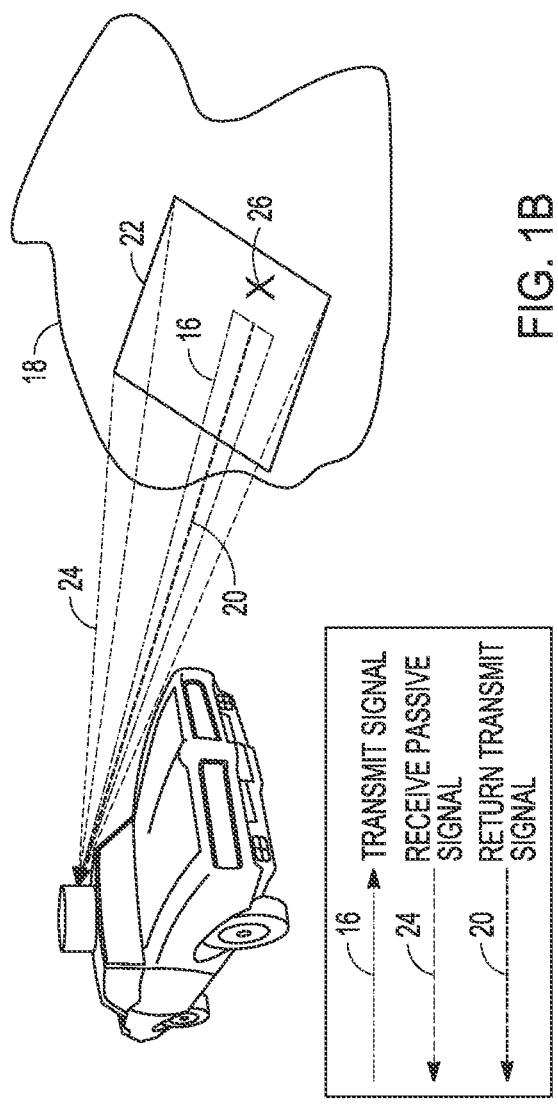
FIG. 1A
FIG. 1B

OPTICAL SENSOR WITH TX/RX APERTURE SHARING ELEMENT (ASE) TO BLOCK DETECTION OF THE RECEIVED ACTIVE SIGNAL

BACKGROUND OF THE INVENTION

Field of the Invention

This invention relates to optical sensors and particularly to gimbaled optical sensors that transmit an active signal at a given wavelength and receive passive signals over a range of wavelengths while controlling pointing without benefit of measuring and locating the active signal return.

Description of the Related Art

Gimbaled optical sensors are commonly used as part of guided munitions and possibly autonomous vehicles. Passive systems use light emissions e.g. IR or visible from a target to detect and track the target. Active systems use an on-board source to emit light e.g. IR or visible, or RF that is reflected from the target to detect and track the target. The active return may be used for ranging, simple guidance commands to a target centroid or active imaging. The on-board source may also be used for other applications. The passive and active systems are often combined.

A typical gimbaled optical sensor includes inner (nod) and outer (roll) gimbals positioned behind a protective dome or window that rotate about orthogonal axes to point an optical axis in a three-dimensional space. An off-gimbal detector is responsive to a band of wavelengths e.g. Visible or IR (SWIR, MWIR, NIR, LWIR, etc.) A telescope mounted on the inner gimbal along the optical axis collects light from the target to form an intermediate image. Gimbal optics propagate the light over the outer (roll) and inner (nod) gimbals along an optical path while preserving image quality. Off-gimbal focus optics relay the intermediate image to the detector. In some applications, an Aperture Sharing Element (ASE) is positioned in a receive aperture to separate the incident light into different wavelength bands e.g. Visible and IR and direct the light to different detectors. In a passive system, the pointer detects only emissions from the target within the field-of-view (FOV) of the telescope. In a passive system, pointing control of a transmitter is performed "open loop", based only on the detection of the passive emissions of the target.

To add active capabilities, an off-gimbal optical source e.g., a laser, emits light in a narrowband around a specified wavelength. This transmit signal is routed along an optical path (free-space or fiber) along the gimbal axes to a transmit telescope where it is transmitted toward the target. The transmit telescope may be mounted off-axis from the receive telescope or a common Tx/Rx telescope may be used for both transmit (Tx) and receive (Rx). In the later case, an ASE may be positioned in a common aperture to couple the transmit signal from the optical source to the common Tx/Rx telescope and to couple the returned transmit signal and the passive emissions from the target to the detector. An additional ASE may be positioned in the receive path to separate the incident light into different wavelength bands and direct the light to different detectors. Processing of the active signal return again may provide for ranging, centroid guidance or active imaging. This allows for pointing control of a transmitter to be performed "closed loop" based on the desired and actual location of the laser spot on the target.

SUMMARY OF THE INVENTION

The following is a summary of the invention in order to provide a basic understanding of some aspects of the invention. This summary is not intended to identify, key or critical elements of the invention or to delineate the scope of the invention. Its sole purpose is to present some concepts of the invention in a simplified form as a prelude to the more detailed description and the defining claims that are presented later.

The present invention provides optical sensors and particularly gimbaled optical sensors that transmit an active signal at a given wavelength and receive passive signals over a range of wavelengths while controlling pointing without benefit of measuring and locating the active signal return. The sensor is configured to block the return of the active signal (e.g. reflections off a target in a scene) and process only the passive emissions. These optical sensors may, for example, be used with guided munitions or autonomous vehicles.

In an embodiment, a common Tx/Rx telescope is mounted on a pair of inner and outer gimbals that point an optical axis. An off-gimbal optical source emits an optical transmit signal (the "active signal") at a first transmission wavelength at a fixed off-gimbal access point. A free-space optical path along the first and second gimbal axes couples light from the common Tx/Rx telescope to an off-gimbal detector. An off-gimbal aperture sharing element (ASE) is positioned in a common Tx/Rx aperture in the free-space optical path. The ASE free-space couples the optical transmit signal from the off-gimbal access point into the free-space optical path and to the common Tx/Rx telescope for transmission towards a scene. The ASE couples light emitted from the scene and received by the common Tx/Rx telescope, other than returns of the optical transmit signal off the scene which are blocked by the ASE, to the off-gimbal detector to passively image the scene at a plurality of wavelengths not including the returned optical transmit signal. The transmitted light and received light are co-boresighted along the optical axis.

In an embodiment, the free-space optical path includes focusing optics that relay an intermediate image from the telescope to the off-gimbal detector. The ASE is positioned within the focusing optics suitably within a relay section of the optics where any structure or optical imperfections of the ASE are not imaged at the detector.

In an embodiment, one or more optical sources emit light at a plurality of transmission wavelengths that are coupled via the ASE into the free-space optical path. Upon return, the plurality of returned optical transmit signals are blocked by the ASE from reaching the detector.

In an embodiment, control circuitry processes the passive returns from the detector to generate a guidance command to control the inner and outer gimbals to point the optic axis in an "open-loop" configuration. The control circuitry may process the returns to detect a target and then activate the off-gimbal optical source to engage the target.

In an embodiment, the ASE includes a dichroic beam splitter that separates the optical transmit and the returned optical transmit signal from passive emissions based on wavelength. The ASE may be configured to reflect the transmission wavelength and pass other wavelengths or to transmit the transmission wavelength and reflect other wavelengths.

In an embodiment, the ASE includes a polarization beam splitter that separates the optical transmit and the returned optical transmit signals from passive emissions based on polarization. The off-gimbal optical source generates the optical transmit signal with a first polarization, which is directed to the telescope. Passive emissions are unpolarized, including in equal amounts first and second orthogonally polarized light. 50% of the unpolarized emissions will be directed via the ASE to the off-gimbal detector. The ASE may be configured to reflect the optical transmit signal and it's returns and pass the other polarization or to transmit the optical transmit signal and it's returns and reflect the other polarization.

In another embodiment, the optical sensor is configured with an ASE that couples the optical transmit signal to the telescope, blocks the returns of the optical transmit signal and directs other passive emissions to a detector. The entire assembly including the optical sources and detector may be fixed or may be mounted on one or more gimbals or other mechanisms to point the optical axis.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 1A and 1B are illustrations of an optical sensor mounted on a guided munition and an autonomous vehicle, respectively, in which in accordance with the present invention an off-gimbal ASE positioned in a common Tx/Rx aperture blocks the optical transmit signal returns from reaching the detector;

DETAILED DESCRIPTION OF THE INVENTION

Figure 2:
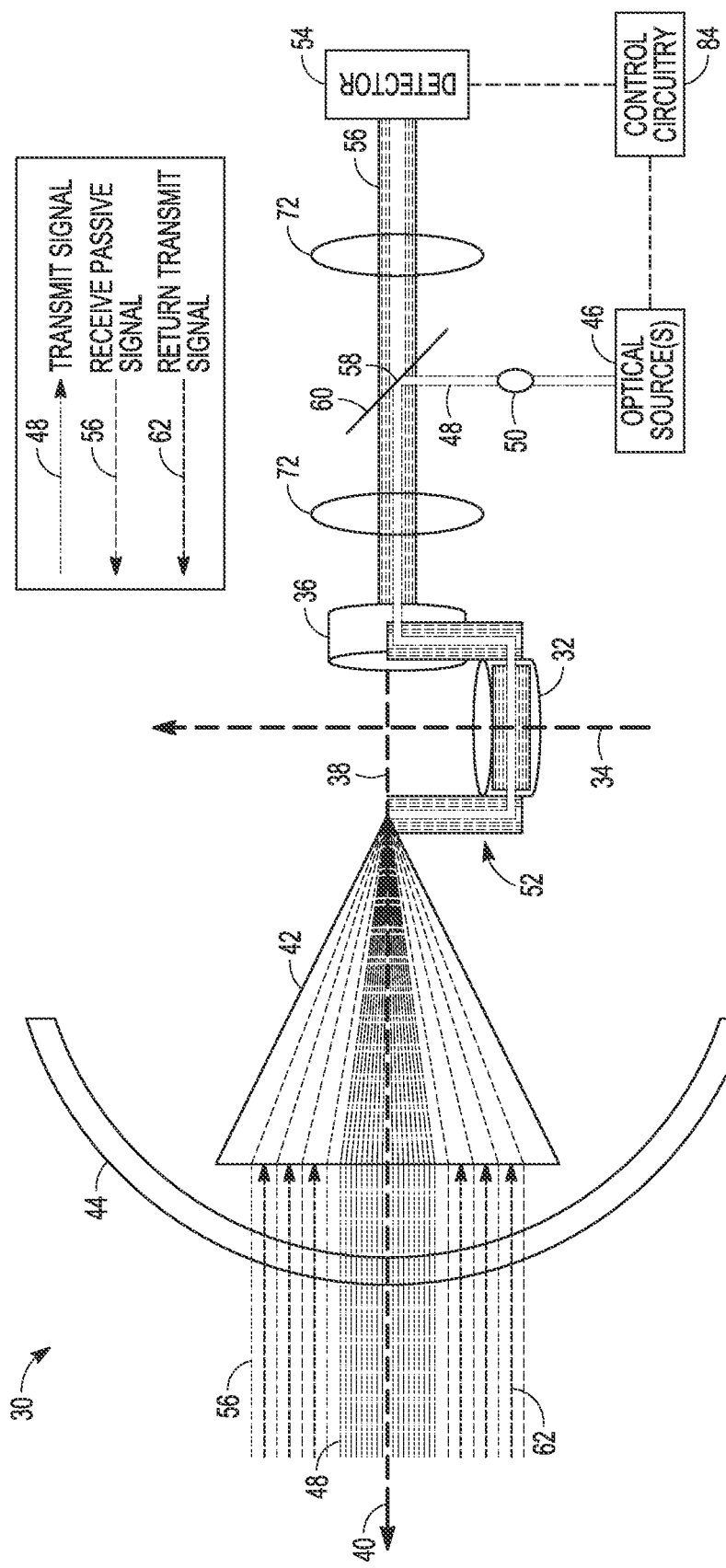
FIG. 2 is a simplified schematic diagram of an embodiment of a gimbaled optical sensor in which an off-gimbal ASE positioned in a common Tx/Rx aperture blocks the optical transmit signal returns from reaching the detector.

The present invention provides optical sensors and particularly gimbaled optical sensors that transmit an active signal at a given wavelength and receive passive signals over a range of wavelengths while controlling pointing without benefit of measuring and locating the active signal return. The sensor is configured to block the return of the active signal (e.g. reflections off a target in a scene) and process only the passive emissions. These optical sensors may, for example, be used with guided munitions or autonomous vehicles.

Referring now to FIGS. 1A and 1B, a guided munition 10 such as a missile, rocket, projectile etc. and an autonomous vehicle 12 such as a car, truck, drone, etc., which could be manned or unmanned, are provided with a gimbaled optical sensor 14. The gimbaled optical sensor directs an optical transmit signal 16 (the "active signal") towards a scene 18, which reflects the light to generate a returned transmit signal 20 that is collected by the sensor's telescope. Within the sensor's field-of-view (FOV) 22 passive emissions 24 are also collected by the sensor's telescope. The optical transmit signal, and thus the returns, may be in the same or different band as the passive emissions. For example, the passive emissions may span a portion of the NIR band and the optical transmit signal could occupy a very narrow band (few nm) around a specific wavelength(s) in the NIR band. Alternately, the passive emissions may span a portion of the NIR band and the optical transmit signal could occupy a narrow band around a specific wavelengths(s) in the Visible band. Other combinations of in and out of band active and passive emissions will exist.

Both the passive emissions 24 and the returned transmit signal 20 are collected by the sensor's telescope. The sensor is configured to block the returned transmit signal 20 and direct only the passive emissions 24 to a detector. Because the active signal returns are blocked, "closed-loop" feedback based on those returns is not available to control the pointing of the optical sensor. Instead the passive returns are used to image the scene and provide "open-loop" pointing control. Furthermore, the passive image may be processed to detect a target 26 in the scene. Upon detection, the sensor activates the transmitter to transmit optical transmit signal 16 to engage the target.

Figure 3:
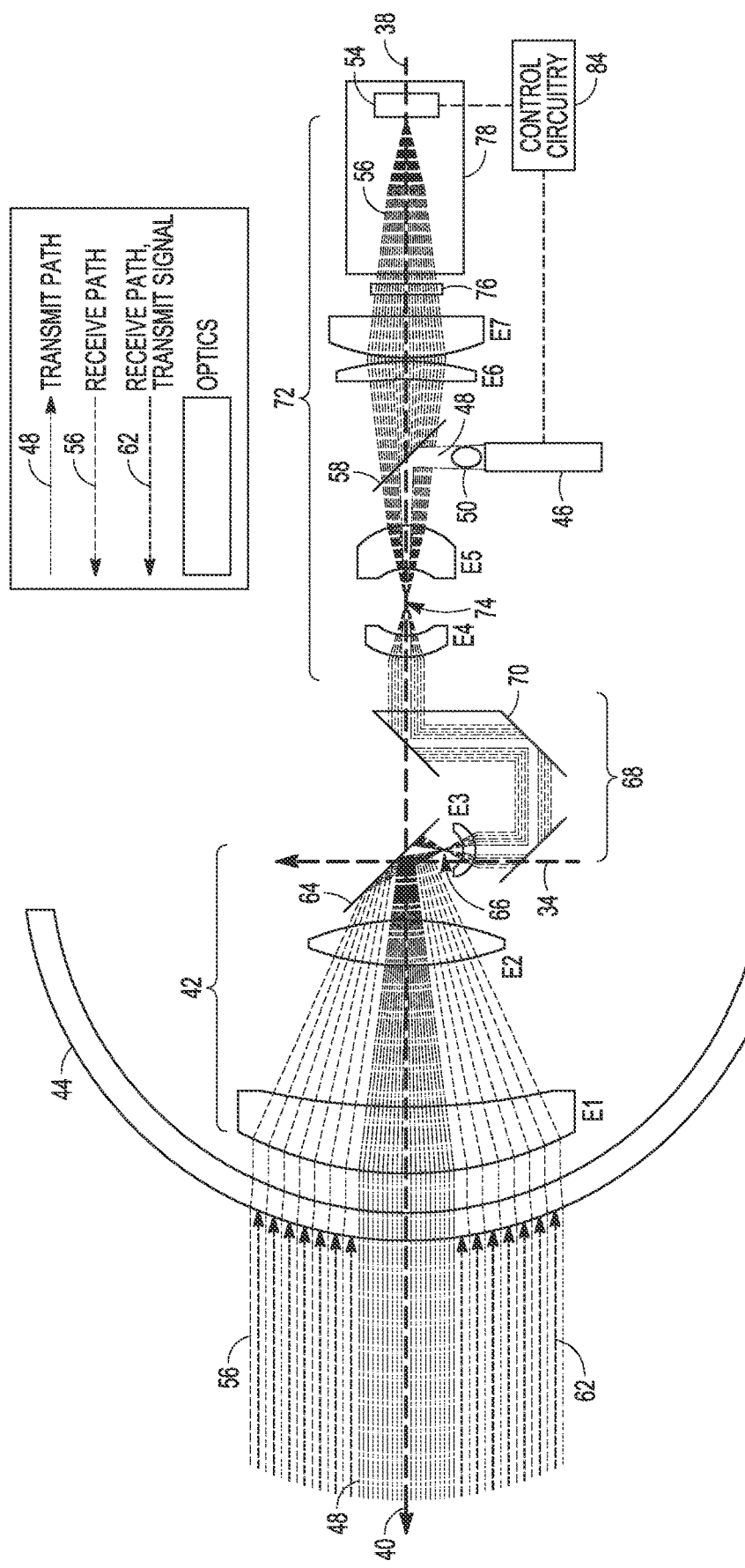
FIG. 3 is a schematic diagram of an embodiment of a gimbaled optical sensor in which an off-gimbal ASE positioned in a common Tx/Rx aperture blocks the optical transmit signal returns from reaching the detector.

Referring now to FIGS. 2 and 3, an embodiment of a gimbaled optical sensor 30 includes an outer (roll) gimbal 32 that rotates around a first gimbal axis 34 and an inner (nod) gimbal 36 that rotates around a second gimbal axis 38 orthogonal to the first gimbal axis to point an optical axis 40 in a multi-dimensional space defined by the first and second gimbal axes. A common Tx/Rx telescope 42 is mounted on the inner gimbal along the optical axis behind a protective optically transparent dome 44. An off-gimbal optical source(s) 46 emits an optical transmit signal 48 at a first transmission wavelength, perhaps multiple wavelengths, at a fixed off-gimbal access point 50. A free-space optical path 52 routed along the first and second gimbal axes couples light 56 from the common Tx/Rx telescope 42 to an off-gimbal detector 54. The transmitted optical transmit signal 48 and received light 56 are co-boresighted along the optical axis 40.

An off-gimbal aperture sharing element (ASE) 58 is positioned in a common Tx/Rx aperture 60 in the free-space optical path 52. ASE 58 free-space couples the optical transmit signal 48 from the off-gimbal access point 50 into the free-space optical path 53 and to the common Tx/Rx telescope for transmission towards a scene. ASE 58 couples light 56 emitted from the scene and received by the common Tx/Rx telescope, other than a returned transmit signal 62 (reflections of optical transmit signal 48 off the scene which is blocked by the ASE, to the off-gimbal detector 54 to passively image the scene at a plurality of wavelengths not including the returned optical transmit signal 62. The sensor is configured to treat the returned optical transmit signal 62 like any other stray light to be absorbed or baffled and kept away from the detector.

As more particularly shown in FIG. 3, the optical system of the sensor for a particular embodiment is shown and will be described in additional detail. Many different configurations of the optical system fall within the scope of the invention in which an off-gimbal ASE directs the optical transmit signal from a fixed off-gimbal access point to the telescope, blocks the received optical transmit signal and passes passive emissions from the scene to an off-gimbal detector.

In this embodiment, optically transparent protective dome 44 has essentially no power. The dome receives collimated light from the scene and outputs collimated, perhaps slightly divergent, light. The dome's function is to maintain a boundary between the environment and the optics. Telescope 42 includes lens elements E1 and E2 and a turning mirror 64 that focus the collimated light from the scene e.g. optical transmit signal returns or passive emissions, and focus an image of the scene onto a field stop (aperture) 66 that limits the sensor FOV.

Free-space optical path 52 includes gimbal (roll & nod) optics 68 that couple light across the gimbal axes to allow the system to rotate about the axes without impacting image quality. The gimbal optics 68 includes lens element E3 and a prism 70 that recollimate the light at the output face of the prism.

Free-space optical path 52 also includes focus optics 72 that relay the intermediate image of the scene initially formed at field stop 66 to the detector over a sufficient distance to accommodate other optomechanical structures and motors. Focus optics 72 include lens element E4 that focuses the collimated light at the output face of the prism to reimage the intermediate image at a field stop 74. Focus optics 72 includes lens elements E5-E7 that serve to relay the intermediate image from field stop 74 to the detector. Additional elements include a filter 76 that selects and passes specific optical bands of the passive emissions through to the detector. For example, filter 76 may include a filter wheel that passes a broadband, a narrowband and performs Non-Uniform Compensation (NUC) on the detector. Many other filter configurations are within the scope of the invention. The detector 54 is part of an integrated Dewar assembly (IDA) that provides a cold volume for detection.

ASE 58 is positioned off gimbal within focus optics 72. The ASE is suitably positioned at a position away from a field stop/image plane at which any structure or optical imperfections of the ASE are not imaged onto the detector. As shown the ASE is positioned within the optical lens elements that relay the intermediate image at a place where the beam is wide and diverging.

The optical system achieves a near diffraction limited output e.g., almost perfect optical performance, devoice of aberrations. Critical to this is the use of the common ASE to free-space couple the optical transmit signal from the fixed access point 50 off-gimbal into the free-space optical path.

Control circuitry 84 processes the passive returns from the detector to generate a guidance command to control the inner and outer gimbals to point the optic axis in an "open-loop" configuration. The control circuitry may process the returns to detect a target and then activate the off-gimbal optical source to engage the target.

Figure 4:
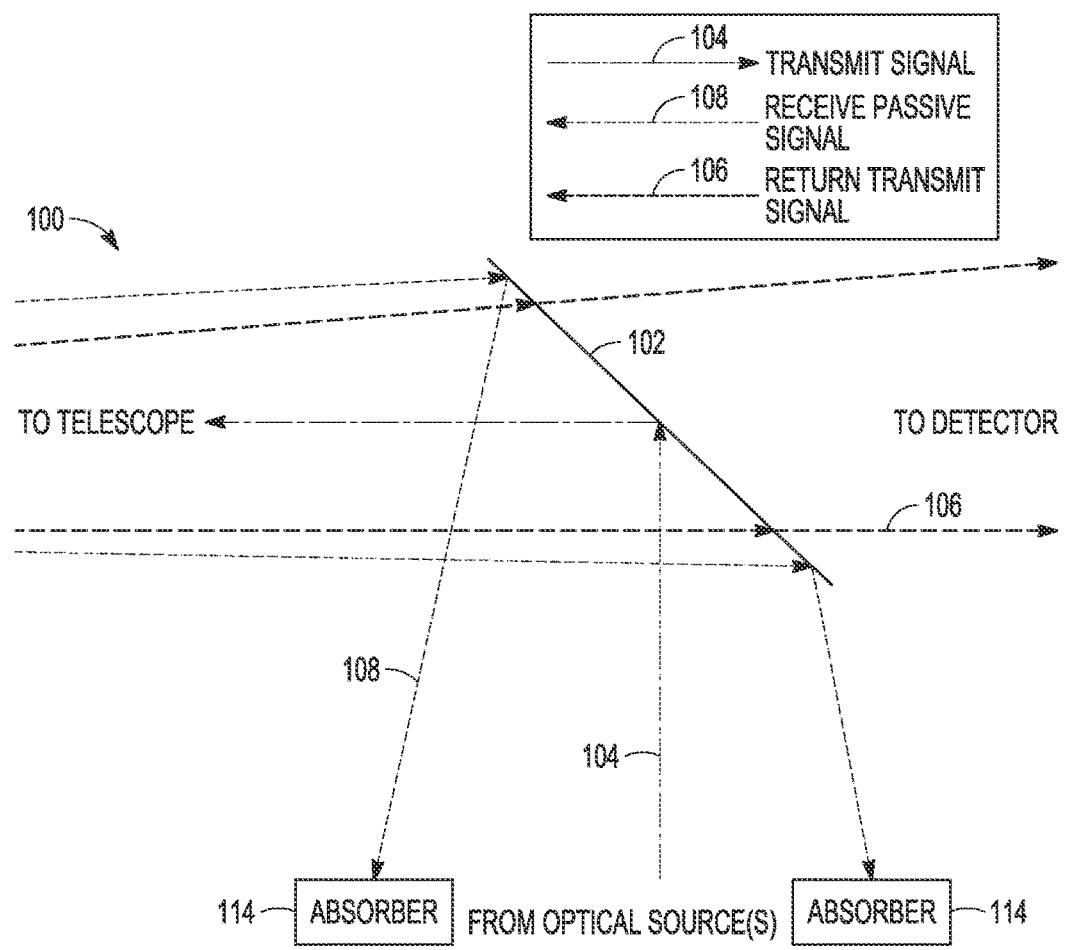
FIGS. 4 and 5 are a ray tracing diagram and a filter response for an ASE implemented with a dichroic beam splitter.
Figure 5:
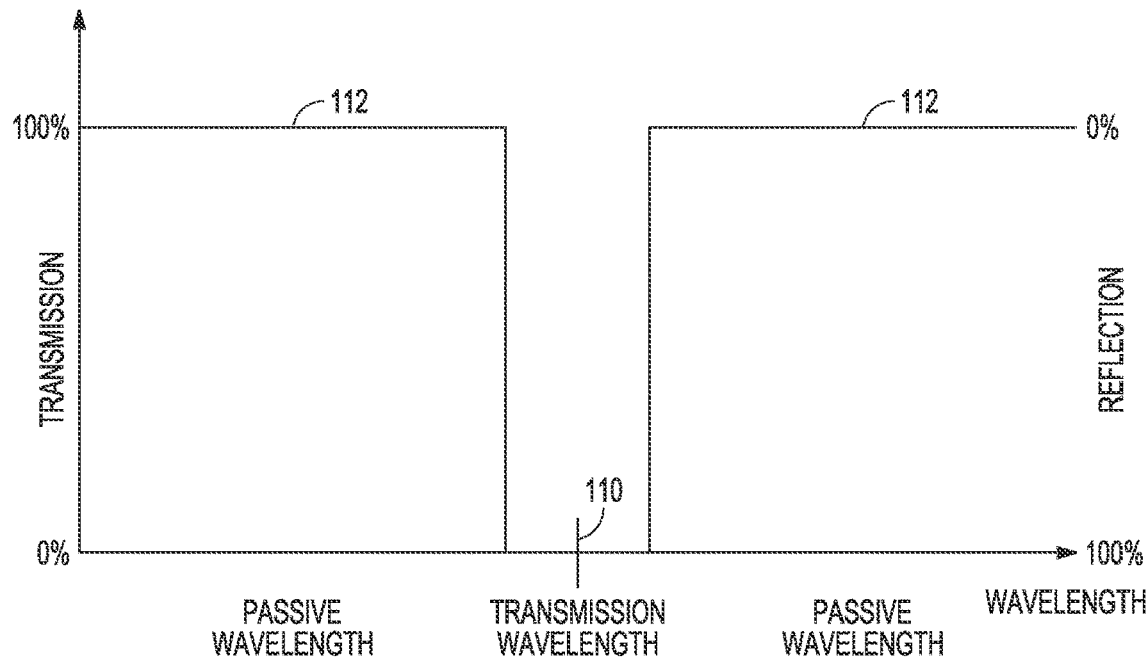

Referring now to FIGS. 4 and 5, an embodiment of an ASE 100 includes a dichroic beam splitter 102 that separates light at the first transmission wavelength from light at wavelengths other than the first transmission wavelength. The dichroic beam splitter 102 is positioned to direct the optical transmit signal 104 from the off-gimbal optical source at the first transmission wavelength into the free-space optical path and to the telescope. The dichroic beam splitter 102 directs light (passive emissions) 106 received by the common Tx/Rx telescope at wavelengths other than said first transmission wavelength, and a narrow band about the first transmission wavelength (few nm), to the off-gimbal detector. The dichroic beam splitter 102 blocks the returned transmit signal 108 from reaching the detector. The sensor is configured to treat the returned optical transmit signal 108 like any other stray light to be absorbed by an absorber (or baffle) 114 and kept away from the detector.

The dichroic beam splitter may be configured to reflect a narrowband of light 110 (the optical transmit signal) and transmit wavelengths outside the narrowband 112 (the passive emissions) or to transmit the narrowband of light and reflect the other wavelengths. As shown in FIGS. 4 and 5, the beam splitter is configured to reflect the narrowband of frequencies about the transmission wavelength of the optical transmit signal and otherwise transmit the passive emissions from the scene.

Figure 6:
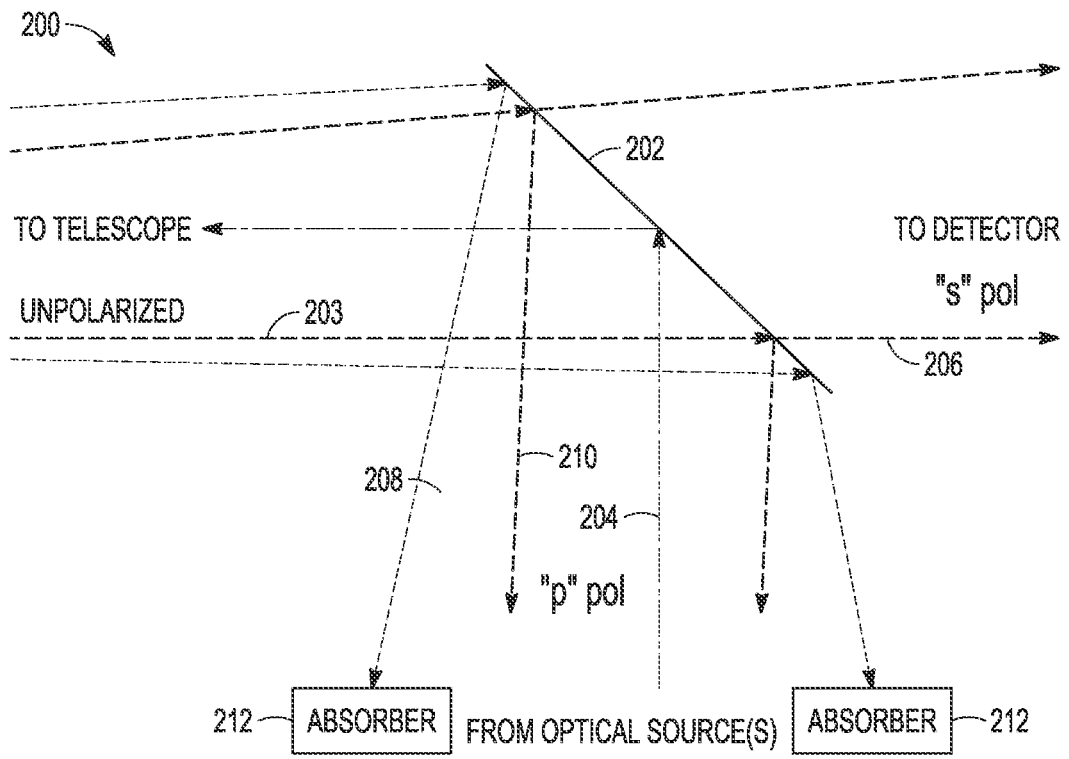
FIGS. 6 and 7 are a ray tracing diagram and a filter response for an ASE implemented with a polarization beam splitter.
Figure 7:
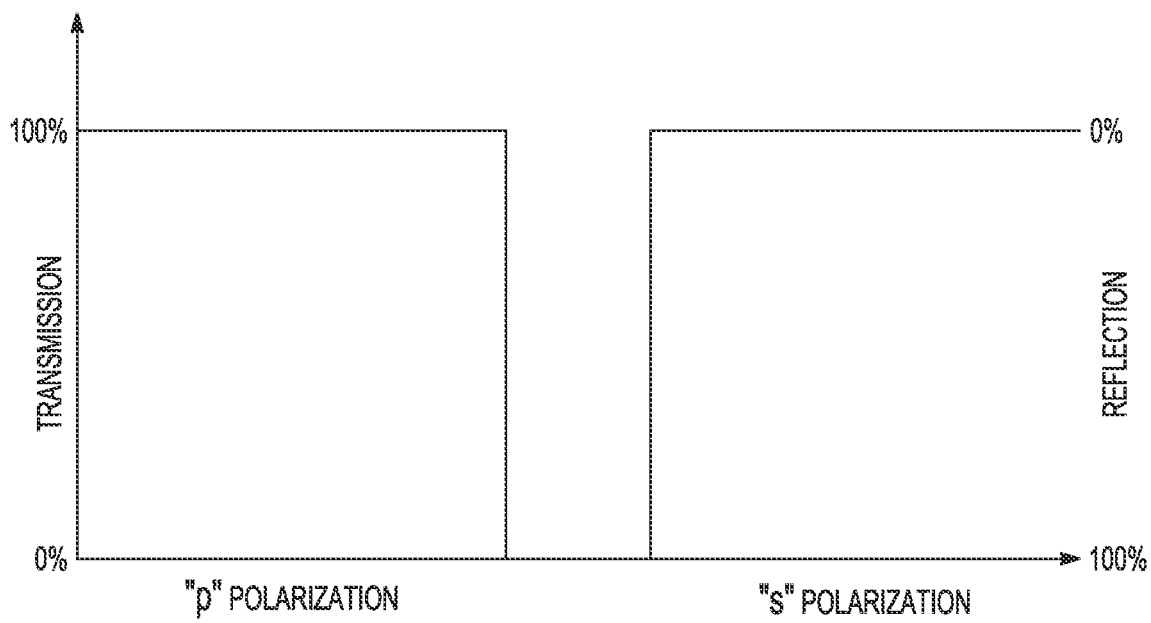

Referring now to FIGS. 6 and 7, an embodiment of an ASE 200 includes a polarization beam splitter 202 that separates light into two beams of differing linear polarization e.g., "s" and "p" polarization, reflecting one polarization and transmitting the other. Ideally the two beams are orthogonally polarized. Unpolarized light such as emissions 203 from a scene is a mixture of 50% "s" polarized light and 50% "p" polarized light. The optical source, typically a laser, typically emits the optical transmit signal 204 with a given polarization, say "p" polarized, at the transmission wavelength. The polarization beam splitter 202 is positioned to direct (reflect) the "p" polarized optical transmit signal 204 from the off-gimbal optical source into the free-space optical path and to the telescope. The polarization beam splitter 202 directs (transmits) the s-polarized component 206 of unpolarized emissions 203 received by the common Tx/Rx telescope to the off-gimbal detector. The polarization beam splitter 202 blocks (reflects) the "p" polarized returned transmit signal 208 and the p-polarized component 210 of passive emissions 203 from reaching the detector. The sensor is configured to treat, the returned transmit signal 208 like any other stray light to be absorbed by an absorber (or baffle) 212 and kept away from the detector. As shown in FIGS. 6 and 7, the beam splitter is configured to reflect the p-polarized optical transmit signal and transmit the passive scene emissions.

Comparing the dichroic and polarization beam splitters, the dichroic has the advantage of passing in theory 100% of the passive emissions from the scene whereas the polarization loses 50% of the passive emissions. However, the polarization beam splitter will pass emissions at the transmission signal wavelength whereas the dichroic filter blocks all light in the narrow transmit band whether it's part of the active signal or the passive emissions.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An optical sensor, comprising:
   an outer gimbal that rotates around a first gimbal axis;
   an inner gimbal that rotates around a second gimbal axis orthogonal to the first gimbal axis to point an optical axis in a multi-dimensional space defined by said first and second gimbal axes;
   a common Tx/Rx telescope mounted on the inner gimbal along the optical axis;
   an off-gimbal detector responsive to light at a plurality of wavelengths in a detection band;
   an off-gimbal optical source that emits an optical transmit signal in a transmit band within the detection band at a fixed off-gimbal access point;

a free-space optical path along the first and second gimbal axes to couple light from the common Tx/Rx telescope to the off-gimbal detector;

an off-gimbal aperture sharing element (ASE) positioned in a common Tx/Rx aperture in the free-space optical path at a fixed angle to the free-space optical path, said ASE free-space coupling the optical transmit signal from the off-gimbal access point into the free-space optical path and to the common Tx/Rx telescope for transmission along the optical axis towards a scene, said common Tx/Rx telescope collecting both passive emissions within the detection band and a returned transmit signal in the transmit band from the scene along the optical axis, said ASE configured at the fixed angle to block the returned transmit signal and to direct the passive emissions to said off-gimbal detector to passively image the scene at a plurality of wavelengths in the detection band not including the returned transmit signal; and an absorber configured to absorb the returned transmit signal;

wherein the transmitted optical transmit signal and the collected returned transmit signal and passive emissions are co-boresighted along the optical axis.

2. The optical sensor of claim 1, wherein said common Tx/Rx telescope produces an intermediate image at a first field stop from received light, said free-space optical path includes gimbal optics that couple light across the first and second gimbal axes and off-gimbal focusing optics that relay the intermediate image of the scene to the off-gimbal detector, wherein the ASE is positioned off-gimbal in the focusing optics.

3. The optical sensor of claim 2, wherein the off-gimbal focusing optics include one or more optical elements to re-image the intermediate image from the telescope at a second field stop and a plurality of optical elements that relay the intermediate image from the second field stop to the off gimbal-detector, wherein the ASE is positioned within the plurality of optical elements that relay the intermediate image at a position at which any structure or optical imperfections of the ASE are not imaged at the detector.

4. The optical sensor of claim 1, wherein one or more off-gimbal optical sources emit light at a plurality of transmission wavelengths within the transmit band, wherein said ASE couples the light at the plurality of transmission wavelengths to the common Tx/Rx telescope and couples light received by the common Tx/Rx telescope at wavelengths other than the plurality of transmission wavelengths to the off-gimbal detector to passively image the scene at wavelengths not including the plurality of transmission wavelengths.

5. The optical sensor of claim 1, further comprising a guided munition on which the optical sensor is mounted.

6. The optical sensor of claim 1, further comprising an autonomous vehicle on which the optical sensor is mounted.

7. The optical sensor of claim 1, further comprising control circuitry coupled to the off-gimbal detector, said control circuitry configured to process the passive emissions detected by the detector to generate a guidance command to control the inner and outer gimbals to point the optical axis.

8. The optical sensor of claim 1, further comprising control circuitry coupled to the off-gimbal detector and the off-gimbal optical source, said control circuitry configured to process the passive emissions detected the detector to detect a target in the scene and to then activate the off gimbal optical source to emit the optical transmit signal to engage the target.

9. The optical sensor of claim 1, wherein the ASE comprises a dichroic beam splitter that at the fixed angle separates light within the transmit band from light at wavelengths other than the transmit band, wherein said dichroic beam splitter is positioned at the fixed angle to direct light from the off-gimbal optical source within the transmit band into the free-space optical path and to direct light received by the common Tx/Rx telescope at wavelengths other than within the transmit band to the off-gimbal detector.

10. The optical sensor of claim 9, wherein the dichroic beam splitter reflects light from the off-gimbal optical source within the transmit band and transmits light at wavelengths within the detection band other than within the transmit b.

11. The optical sensor of claim 1, wherein the scene emits unpolarized light including first and second polarization states, wherein the off-gimbal optical source is configured to emit the optical transmit signal in the first polarization state, wherein the ASE comprises a polarization beam splitter at the fixed angle that directs the optical transmit signal in only the first polarization state into the free-space optical path, directs light received by the common Tx/Rx telescope in only the second polarization state to the off-gimbal detector and blocks light received in the first polarization state from the off-gimbal detector.

12. The optical sensor of claim 11, wherein the polarization beam splitter reflects light in the first polarization state and transmits light in the orthogonal polarization state.

13. An optical sensor, comprising:
an outer gimbal that rotates around a first gimbal axis;
an inner gimbal that rotates around a second gimbal axis orthogonal to the first gimbal axis to point an optical axis in a multi-dimensional space defined by said first and second gimbal axes;
a common Tx/Rx telescope mounted on the inner gimbal along the optical axis, said common Tx/Rx telescope receiving light to produce an intermediate image;
an off-gimbal detector responsive to light at a plurality of wavelengths in a detection band;
an off-gimbal optical source that emits an optical transmit signal in a transmit band within the detection band at a fixed off-gimbal access point;
a free-space optical path including gimbal optics that route light along the first and second gimbal axes and off-gimbal focus optics that relay the intermediate image to the off-gimbal detector;
a an off-gimbal aperture sharing element (ASE) positioned in a common Tx/Rx aperture in the free-space optical path at a fixed angle to the free-space optical path, said ASE free-space coupling the optical transmit signal from the off-gimbal access point into the free-space optical path and to the common Tx/Rx telescope for transmission along the optical axis, towards a scene, said common Tx/Rx telescope collecting both passive emissions within the detection band and a returned transmit signal in the transmit band from the scene along the optical axis, said ASE configured at the fixed angle to block the returned transmit signal and to direct the passive emissions to said off-gimbal detector to passively image the scene at a plurality of wavelengths in the detection band not including the returned transmit signal;
an absorber configured to absorb the returned transmit signal; and
control circuitry coupled to the off-gimbal detector, said control circuitry configured to process the passive emission to generate a guidance command to control the inner and outer gimbals to point the optical axis to detect a target in the scene and to then activate the off-gimbal optical source to emit the optical transmit signal to engage the target.

14. The optical sensor of claim 13, wherein the ASE comprises a dichroic beam splitter that at the fixed angle separates light within the transmit band from light at wavelengths other than the transmit band, wherein said dichroic beam splitter is positioned at the fixed angle to direct light from the off-gimbal optical source within the transmit band into the free-space optical path and to direct light received by the common Tx/Rx telescope at wavelengths other than within the transmit band to the off-gimbal detector.

15. The optical sensor of claim 13, wherein the scene emits unpolarized light including first and second polarization states, wherein the off-gimbal optical source is configured to emit the optical transmit signal in the first polarization state, wherein the ASE comprises a polarization beam splitter at the fixed angle that directs the optical transmit signal in only the first polarization state into the free-space optical path, directs light received by the common Tx/Rx telescope in only the second polarization state to the off-gimbal detector and blocks light received in the first polarization state from the off-gimbal detector.

16. An optical sensor, comprising:
a common Tx/Rx telescope mounted along an optical axis;
a detector responsive to light at a plurality of wavelengths in a detection band;
an optical source that emits an optical transmit signal in a transmit band within the detection band at an access point;
a free-space optical path to couple light from the common Tx/Rx telescope to the detector;
an aperture sharing element (ASE) positioned in a common Tx/Rx aperture in the free-space optical path at a fixed angle to the free-space optical path, said ASE free-space coupling the optical transmit signal from the access point into the free-space optical path and to the common Tx/Rx telescope for transmission along the optical axis towards a scene, said common Tx/Rx telescope collecting both passive emissions within the detection band and a returned transmit signal in the transmit band from the scene along the optical axis, said ASE configured at the fixed angle to block the returned transmit signal and to direct the passive emissions to said detector to passively image the scene at a plurality of wavelengths in the detection band not including the returned transmit signal; and
an absorber configured to absorb the returned transmit signal;
wherein the transmitted optical transmit signal and the collected returned transmit signal and passive emissions are co-boresighted along the optical axis.

17. The optical sensor of claim 16, further comprising control circuitry coupled to the detector, said control circuitry configured to process passive emissions detected by the detector to generate a guidance command to point the optical axis to detect a target in the scene and to then activate the optical source to emit the optical transmit signal to engage the target.

18. The optical sensor of claim 16, wherein the ASE comprises a dichroic beam splitter that at the fixed angle separates light within the transmit band from light at wavelengths other than the transmit band, wherein said dichroic beam splitter is positioned at the fixed angle to direct light from the off-gimbal optical source within the transmit band into the free-space optical path and to direct light received by the common Tx/Rx telescope at wavelengths other than within the transmit band to the off-gimbal detector.

19. The optical sensor of claim 16, wherein the scene emits unpolarized light including first and second polarization states, wherein the off-gimbal optical source is configured to emit the optical transmit signal in the first polarization state, wherein the ASE comprises a polarization beam splitter at the fixed angle that directs the optical transmit signal in only the first polarization state into the free-space optical path, directs light received by the common Tx/Rx telescope in only the second polarization state to the off-gimbal detector and blocks light received in the first polarization state from the off-gimbal detector.

* * * * *

UNITED STATES PATENT AND TRADEMARK OFFICE
CERTIFICATE OF CORRECTION

PATENT NO. : 11,835,705 B2
APPLICATION NO. : 17/065177
DATED : December 5, 2023
INVENTOR(S) : Uyeno et al.

It is certified that error appears in the above-identified patent and that said Letters Patent is hereby corrected as shown below:

In the Specification

In Column 2, Line 8, delete "identify," and insert --identify-- therefor

In Column 4, Line 52, after "scene", insert --),--

In Column 6, Line 32, delete "treat," and insert --treat-- therefor

In the Claims

In Column 7, Line 65, in Claim 8, delete "off gimbal" and insert --off-gimbal-- therefor In Column 8, Line 13, in Claim 10, delete "transmit b." and insert --transmit band.-- therefor In Column 8, Line 46, in Claim 13, delete "a an" and insert --an-- therefor In Column 8, Line 52, in Claim 13, delete "axis," and insert --axis-- therefor Signed and Sealed this
Seventh Day of January, 2025

Derrick Brent
*Acting Director of the United States Patent and Trademark Office*